US009715717B2

(12) United States Patent
Liou et al.

(10) Patent No.: US 9,715,717 B2
(45) Date of Patent: Jul. 25, 2017

(54) IMAGE PROCESSING METHOD

(71) Applicant: Wistron Corp., New Taipei (TW)

(72) Inventors: Pin-Hong Liou, New Taipei (TW); Tzu Yao Lin, New Taipei (TW)

(73) Assignee: Wistron Corp., New Taipei (TW)

( * ) Notice: Subject to any disclaimer, the term of this patent is extended or adjusted under 35 U.S.C. 154(b) by 120 days.

(21) Appl. No.: 14/740,173

(22) Filed: Jun. 15, 2015

(65) Prior Publication Data
US 2016/0247258 A1 Aug. 25, 2016

(30) Foreign Application Priority Data

Feb. 25, 2015 (TW) .............................. 104105988 A

(51) Int. Cl.
| | |
|---|---|
| *G09G 5/02* | (2006.01) |
| *G09G 5/39* | (2006.01) |
| *G06T 11/00* | (2006.01) |
| *G06T 5/00* | (2006.01) |
| *G06T 3/00* | (2006.01) |
| *G06F 7/544* | (2006.01) |
| *G06T 1/60* | (2006.01) |

(52) U.S. Cl.
CPC ...................................... *G06T 1/60* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0291499 | A1* | 11/2008 | Chang | ................ H04N 1/40087 358/3.03 |
| 2010/0111446 | A1 | 5/2010 | Lim et al. | |
| 2011/0243219 | A1* | 10/2011 | Hong | ................... H04N 19/176 375/240.02 |
| 2015/0365674 | A1* | 12/2015 | Cheong | ................ H04N 19/126 382/238 |
| 2016/0042246 | A1* | 2/2016 | Herrmann | .......... G06K 9/00986 382/190 |

* cited by examiner

*Primary Examiner* — Wesner Sajous

(57) ABSTRACT

The present invention provides an image processing method applied to a graphics processing unit including: receiving data of an image, wherein the image is a first rectangle constituted by a plurality of pixels, and the pixels of the image are represented by a plurality of image values with a predetermined bit depth in the data; using a predetermined number of bits to perform an accumulation of the image values of the pixels for constructing an integral image of the image, wherein the predetermined number of bits is less than $\log_2(W \times H \times 2^k)$ number of bits, W is the width of the first rectangle, H is the length of the first rectangle, and k is the predetermined bit depth.

16 Claims, 6 Drawing Sheets

F0

| 2 (P1_1) | 1 (P1_2) | 2 (P1_3) | 3 (P1_4) | 4 (P1_5) | 3 (P1_6) |
|---|---|---|---|---|---|
| 3 (P2_1) | 2 (P2_2) | 1 (P2_3) | 2 (P2_4) | 2 (P2_5) | 3 (P2_6) |
| 4 (P3_1) | 2 (P3_2) | 1 (P3_3) | 1 (P3_4) | 1 (P3_5) | 2 (P3_6) |

W=6, H=3

IF0

| 2 (P1_1) | 3 (P1_2) | 5 (P1_3) | 8 (P1_4) | 12 (P1_5) | 15 (P1_6) |
|---|---|---|---|---|---|
| 5 (P2_1) | 8 (P2_2) | 11 (P2_3) | 16 (P2_4) | 22 (P2_5) | 28 (P2_6) |
| 9 (P3_1) | 14 (P3_2) | 18 (P3_3) | 29 (P3_4) | 31 (P3_5) | 39 (P3_6) |

IMAGE PROCESSING METHOD

CROSS REFERENCE TO RELATED APPLICATIONS

This application claims priority of Taiwan Patent Application No. 104105988, filed on Feb. 25, 2015, the entirety of which is incorporated by reference herein.

BACKGROUND OF THE INVENTION

Field of the Invention

The present invention relates to an image processing method, in particular to an image processing method about image integration.

Description of the Related Art

Presently, mobile devices are highly developed and multifunctional. For example, handheld devices such as mobile phones and tablets are capable of conducting telecommunication services, receiving and transmitting e-mails, maintaining social networks, managing contacts, and playing media. Hence, users can implement various applications on their mobile devices, such as phone calls, social networks, or commercial applications.

More and more image processing devices used in the small embedded systems, wherein some of the image processing devices are required to perform image integration. Image integration can reduce the time required for operation. However, how to improve the image integration is an important issue.

BRIEF SUMMARY OF THE INVENTION

A detailed description is given in the following embodiments with reference to the accompanying drawings.

The present invention provides an image processing method applied to a graphics processing unit. The image processing method includes: receiving data of an image, wherein the image is a first rectangle, the first rectangle is constituted by a plurality of pixels, and the pixels of the image are represented by a plurality of image values with a predetermined bit depth in the data; using a predetermined number of bits to perform an accumulation of the image values of the pixels for performing an integration operation on each of the pixels of the image, wherein the predetermined number of bits is less than $\log_2(W \times H \times 2^k)$ number of bits, W is the width of the first rectangle, H is the length of the first rectangle, and k is the predetermined bit depth; obtaining a plurality of integral values of the pixels by the integration operation, wherein at least one of the integral values is the overflow value; and storing the integral values into a volatile memory to construct an integral image of the image.

Additionally, the present invention further discloses an image processing method applied to a graphics processing unit. The image processing method includes: determining the position of a region of interest in an image in response to a calculation command, and selecting a first pixel, a second pixel, a third pixel, a fourth pixel and a fifth pixel from a plurality pixels of the image according to the position, wherein the image is a first rectangle, the first rectangle is constituted by the pixels, each of the pixels has a predetermined bit depth, the first pixel is at a corner of the first rectangle, the region of interest is a second rectangle; calculating C−B−D+A by an integral image of the image, wherein the integral image includes a plurality of integral values of the pixels, A is the integral value of the second pixel, B is the integral value of the third pixel, C is the integral value of the fourth pixel, and D is the integral value of the fifth pixel; when C−B−D+A≤0, determining a gray-level sum of the region of interest is equal to $C-B-D+A+2^{j'}$, wherein k' is a predetermined number of bits; and when C−B−D+A>0, determining the gray-level sum of the region of interest is equal to C−B−D+A.

BRIEF DESCRIPTION OF THE DRAWINGS

The present invention can be more fully understood by reading the subsequent detailed description and examples with references made to the accompanying drawings, wherein:

FIG. 3 is a schematic diagram illustrating an embodiment of an integral image of an exemplary embodiment;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
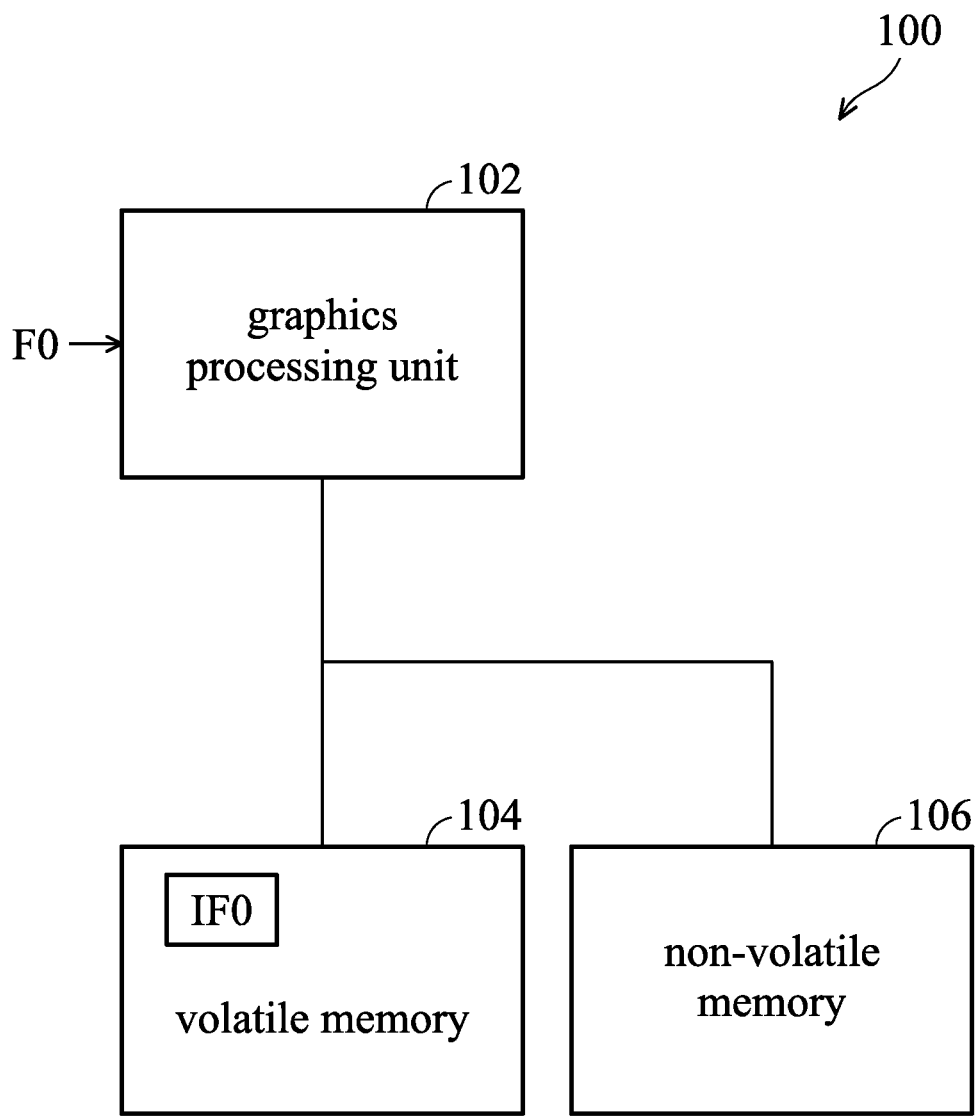
FIG. 1 is a schematic diagram illustrating an embodiment of a graphics processing device of an exemplary embodiment.

FIG. 1 is a schematic diagram illustrating an embodiment of a graphics processing device of an exemplary embodiment. Those skilled in the art may implement the graphics processing device 100 on a computer configuration, like hand-held devices, portable devices, personal digital assistants (PDA), microprocessor-based or programmable consumer electronics, etc. The graphics processing device 100 includes a graphics processing unit 102, a volatile memory 104 and a non-volatile memory 106.

The graphics processing unit 102 may include a graphics-processing unit (GPU) or a plurality of processors in parallel processing environment. The graphics processing unit 102 is arranged to receive the data of an image F0 and process the received image F0. Namely, the graphics processing unit 102 is arranged to perform the image processing method of the present invention.

The volatile memory 104 is a random access memory (RAM). The non-volatile memory 106 can be a read only memory (ROM) or a flash ROM. The non-volatile memory 106 is arranged to store the program codes arranged to be performed by the graphics processing unit 102. Generally, the program codes include routines, programs, objects, components or Web Services, etc. The volatile memory 104 can temporarily store the program codes and the parameters arranged to be performed by the graphics processing unit 102 for faster retrieval.

It should be noted that, in one embodiment, the graphics processing device 100 can be implemented in a digital camera, a monitor, a camera or a computer device. The graphics processing device 100 is arranged to perform image recognition on the received image F0. Moreover, the graphics processing unit 102 is further arranged to produce an integral image IF0 according to the received image F0, and store the integral image IF0 into the volatile memory 104. The graphics processing unit 102 can perform the image recognition on the image F0 according to the integral image IF0 stored in the volatile memory 104.

Figure 2:
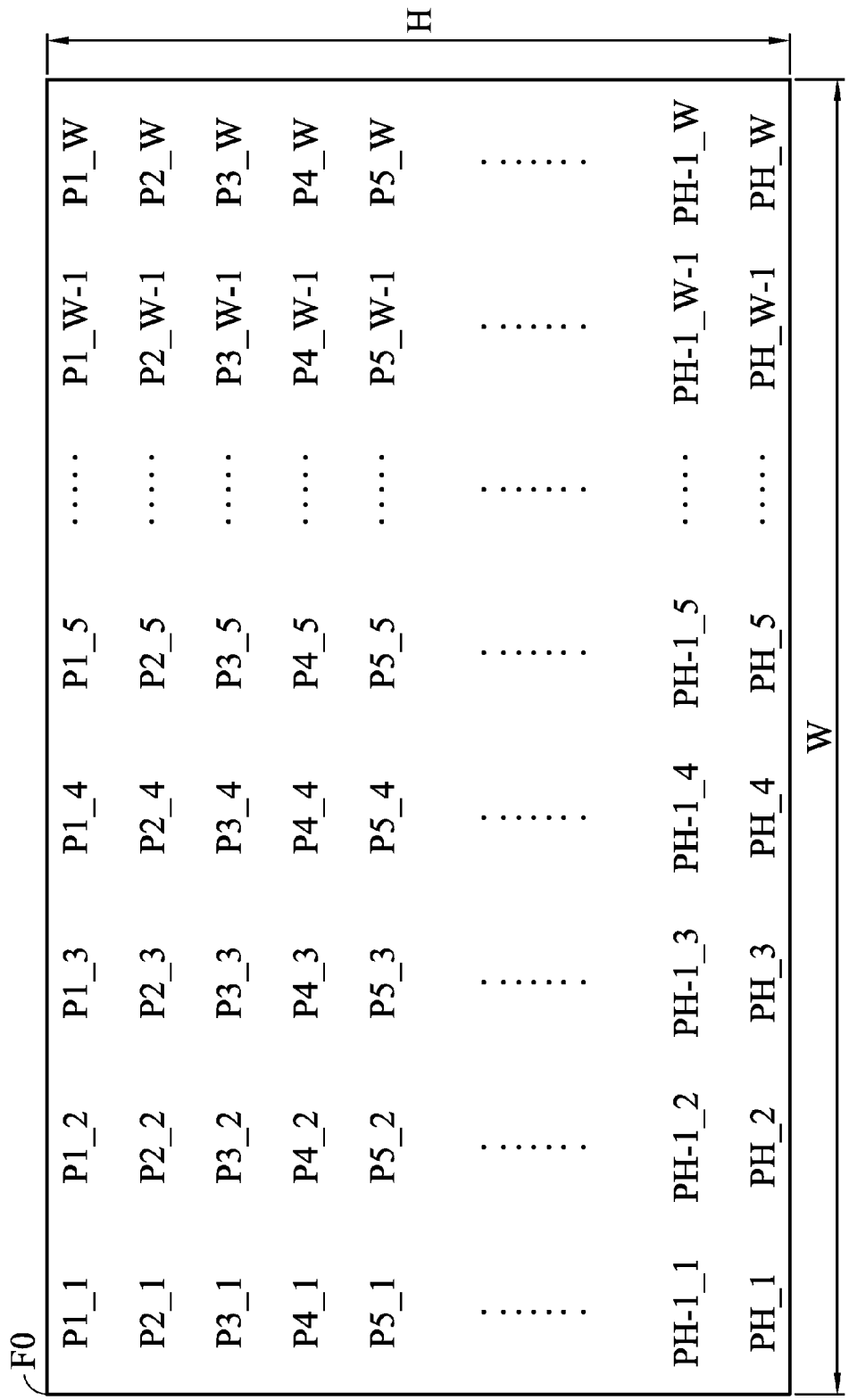
FIG. 2 is a schematic diagram illustrating an embodiment of an image of an exemplary embodiment.

FIG. 2 is a schematic diagram illustrating an embodiment of an image of an exemplary embodiment. The image F0 is a first rectangle, the first rectangle comprises a plurality of pixels P1_1~PH_W, wherein the pixels P1_1~PH_W of the image F0 are represented by a plurality of image values with a predetermined bit depth in the data of the image F0, wherein the predetermined bit depth indicates the information of the pixel, the W is the width of first rectangle, H is the length of the first rectangle, and k is the predetermined bit depth. Namely, the first rectangle is constituted by the pixels P1_1~PH_W, wherein on the width side of the first rectangle has a number W of pixels, on the length side of first rectangle has a number H of pixels, and the image values which are arranged to represent the pixels P1_1~PH_W has a k number of bits. It should be noted that, in one embodiment the image value can be the gray level, but it is not limited thereto. In other embodiments, the image values can also be the intensities or other information.

FIG. 3 is a schematic diagram illustrating an embodiment of an integral image of an exemplary embodiment. In the embodiment of FIG. 3, the image F0 (the first rectangle) comprises a plurality of pixels P1_1~P3_6, wherein the width of the image F0 (the first rectangle) is 6, the length of the image F0 (the first rectangle) is 3, and the k is the predetermined bit depth. Namely, the image F0 (the first rectangle) is constituted by the pixels P1_1~P3_6, the width side of the image F0 (the first rectangle) has 6 pixels, the length side of the image F0 (the first rectangle) has 3 pixels, but it is not limited thereto. The length and the width of the image F0 (the first rectangle) are rational. For example, the length and the width of the image F0 (the first rectangle) can be 1024, 600, 1280 or 720, etc. Namely, the length and the width of the image F0 (the first rectangle) corresponds to the resolution of the image F0. In this embodiment, the gray levels (the image values) of the pixels P1_1~P3_6 of the image F0 are 2, 1, 2, 3, 4, 3, 3, 2, 1, 2, 2, 3, 4, 2, 1, 1, 1 and 2.

The graphics processing unit 102 is arranged to perform accumulations of the gray levels (the image values) of the pixels P1_1~P3_6 from a first pixel of the pixels P1_1~P3_6 to perform an integration operation on each of the pixels P1_1~P3_6 of the image F0. It should be noted that the first pixel is at a corner of the first rectangle. In this embodiment, the pixels at the corner of the first rectangle are the pixel P1_1, the pixel P1_6, the pixel P3_1 and the pixel P3_6. The graphics processing unit 102 selects one pixel from the pixel P1_1, the pixel P1_6, the pixel P3_1 and the pixel P3_6 to be the first pixel. In this embodiment, the graphics processing unit 102 selects the pixels P1_1 to be the first pixel, but it is not limited thereto. In other embodiments, the graphics processing unit 102 can select the pixel P1_6, the pixel P3_1 or the pixel P3_6 to be the first pixel. As the integral image IF0 shown in FIG. 3, the graphics processing unit 102 performs the integration operation on each of the pixels P1_1~P3_6 of the image F0 to produce the integral image IF0 of the image F0. More specifically, the graphics processing unit 102 takes the original gray level of the first pixel P1_1 of the image F0 as the integral value of the first pixel P1_1 of the integral image IF0, such that the integral value of the first pixel P1_1 is 2. Next, the graphics processing unit 102 adds the gray levels of the first pixel P1_1 and the pixel P1_2 to obtain the integral value of the pixel P1_2 of the integral image IF0, such that the integral value of the pixels P1_2 of the integral image IF0 is 2+1=3. Next, the graphics processing unit 102 adds the gray levels of the first pixel P1_1, the pixel P1_2 and the pixel P1_3 to obtain the integral value of the pixels P1_3 of the integral image IF0, such that the integral value of the pixel P1_3 of the integral image IF0 is 2+1+2=5. Next, the graphics processing unit 102 adds the gray levels of the first pixel P1_1, the pixel P1_2, the pixel P1_3 and the pixel P1_4 to obtain the integral value of the pixel P1_4 of the integral image IF0, such that the integral value of the pixel P1_4 of the integral image IF0 is 2+1+2+3=8. Next, the graphics processing unit 102 adds the gray levels of the first pixel P1_1, pixels P1_2, the pixel P1_3, the pixel P1_4 and the pixel P1_5 to obtain the integral value of the pixel P1_5 of the integral image IF0, such that the integral value of the pixel P1_5 of the integral image IF0 is 2+1+2+3+4=12. Next, the graphics processing unit 102 adds the gray levels of the first pixel P1_1, pixels P1_2, the pixel P1_3, the pixel P1_4, the pixel P1_5 and the pixel pixels P1_6 to obtain the integral value of the pixel P1_6 of the integral image IF0, such that the integral value of the pixel P1_6 of the integral image IF0 is 2+1+2+3+4+3=15. Next, the graphics processing unit 102 adds the gray levels of the first pixel P1_1, and the pixel P2_1 to obtain the integral value of the pixel P2_1 of the integral image IF0, such that the integral value of the pixel P2_1 of the integral image IF0 is 2+3=5. Next, the graphics processing unit 102 adds the gray levels of the first pixel P1_1, the pixel P1_2, the pixel P2_1 and the pixel P2_2 to obtain the integral value of the pixel P2_2 of the integral image IF0, such that the integral value of the pixel P2_2 of the integral image IF0 is 2+3+1+2=8, and so on. Namely, the graphics processing unit 102 adds the gray level of a current processed pixel and the gray levels of the pixels on the left side and the upper side of the current processed pixel to obtain the integral value of the current processed pixel. Moreover, the graphics processing unit 102 stores the integral values into the volatile memory 104 to construct the integral image IF0 of the image F0.

Based on the integration operation, each of the integral values requires $\log_2(W \times H \times 2^k)$ of bits to store. Namely, the integral image IF0 needs $W \times H \times \log_2(W \times H \times 2^k)$ of bits to store. However, the memory space relates to the volume, cost, and calculation speed of the device.

Therefore, in another embodiment of the present invention, the integral image IF0 only requires a memory space less than $W \times H \times \log_2(W \times H \times 2^k)$ of bits to be stored. Namely, each of the integral values only needs a memory space less than $\log_2(W \times H \times 2^k)$ to be stored. However, when the memory space of each of the integral value is less than $\log_2(W \times H \times 2^k)$, the result of the integration operation may include overflow values. Therefore, the embodiments also provide a method to overcome the overflow values.

More specifically, the graphics processing unit 102 uses a predetermined number of bits to perform accumulations on each of the pixels P1_1~PH_W to accumulate the image values (the gray levels) of the pixels P1_1~PH_W for performing an integration operation on each of the pixels P1_1~PH_W of the image F0, wherein the predetermined number of bits is less than $\log_2(W \times H \times 2^k)$ number of bits. The graphics processing unit 102 obtains a plurality of integral values of the pixels P1_1~PH_W by the integration operation. However, when the graphics processing unit 102 uses the predetermined number of bits which is less than $\log_2(W \times H \times 2^k)$ to perform the integration operation, the results of the integration operation of some of the pixels may have arithmetic overflow. Therefore, at least one of the integral values of the integral image IF0 is the overflow value. For example, the predetermined number of bits is k', a specific pixel has a $N_X$ number of times of arithmetic overflow in the integration operation, and the integral value of the specific pixel in the integral image IF0 is X. Therefore, the integral value of the specific pixel in the integral image IF0 is an overflow value, and the correct integral value of the specific pixel is $X+N_X \times 2^{k'}$.

In one embodiment, the graphics processing unit 102 determines the predetermined number of bits according to the size of the region of interest ROI. More specifically, the graphics processing device 100 is arranged to recognize at least one specific object in the image F0, such as human faces, license plates, barcodes, etc., but it is not limited thereto. Therefore, the region of interest ROI of the graphics processing device 100 has a predetermined fixed size. For example, when the specific object is the human face, the region of interest ROI is a rectangle having a size that can contain a human face. When the specific object is the license plate, the region of interest ROI is a rectangle having a size that can contain a license plate, but it is not limited thereto. In the present invention, the region of interest ROI is a second rectangle having a fixed size, wherein M is the width of the second rectangle, N is the length of the second rectangle. Namely, on the width side of the region of interest ROI (the second rectangle) has a number M of pixels, and on the length side of the region of interest ROI (the second rectangle) has a number N of pixels. In one embodiment, the graphics processing unit 102 determines the predetermined number of bits is $\log_2(M \times N \times 2^k)$ number of bits according to the size of the region of interest ROI. Namely, each of the pixels P1_1~PH_W of the image F0 having W×H pixels needs $\log_2(M \times N \times 2^k)$ of bits to store, and the integral image IF0 requires $W \times H \times \log_2(M \times N \times 2^k)$ of bits to store.

It should be noted that the graphics processing unit 102 calculates the sum of the image values in the region of interest ROI by using the integral image IF0 in response to a calculation command after the integral image IF0 is produced. It should be noted that the calculation command can be produced by the graphics processing unit 102 or received from other devices. When the graphics processing unit 102 receives the calculation command, the graphics processing unit 102 determines a position of the second rectangle corresponding to the region of interest ROI in the image F0 according to the calculation command, and selects a second pixel, a third pixel, a fourth pixel and a fifth pixel from the pixels of the image F0 according to the determined position. Next, the graphics processing unit 102 calculates C−B−D+A by using the integral image IF0, wherein A is the integral value of the second pixel of the integral image IF0, B is the integral value of the third pixel of the integral image IF0, C is the integral value of the fourth pixel of the integral image IF0, and D is the integral value of the fifth pixel of the integral image IF0. It should be noted that the integral value of the second pixel corresponds to a third rectangle, the integral value of the third pixel corresponds to a fourth rectangle, the integral value of the fourth pixel corresponds to a fifth rectangle and the integral value of the fifth pixel corresponds to a sixth rectangle. The first pixel and the fourth pixel are at opposite corners of the fifth rectangle. The fourth pixel is at a corner of the second rectangle. The fifth rectangle incorporates the second rectangle, the third rectangle, the fourth rectangle and the sixth rectangle. The second rectangle does not overlap with all of the third rectangle, the fourth rectangle and the sixth rectangle. The overlap between the fourth rectangle and the sixth rectangle is the third rectangle. When C−B−D+A≤0, the graphics processing unit 102 determines that the image-value sum (the gray-level sum) of the region of interest ROI is $C-B-D+A+2^{k'}$, wherein k' is predetermined number of bits. Namely, k' is $\log_2(M \times N \times 2^k)$. When C−B−D+A≤0, the graphics processing unit 102 determines that the image-value sum (gray-level sum) of the region of interest ROI is C−B−D+A.

Figure 4:
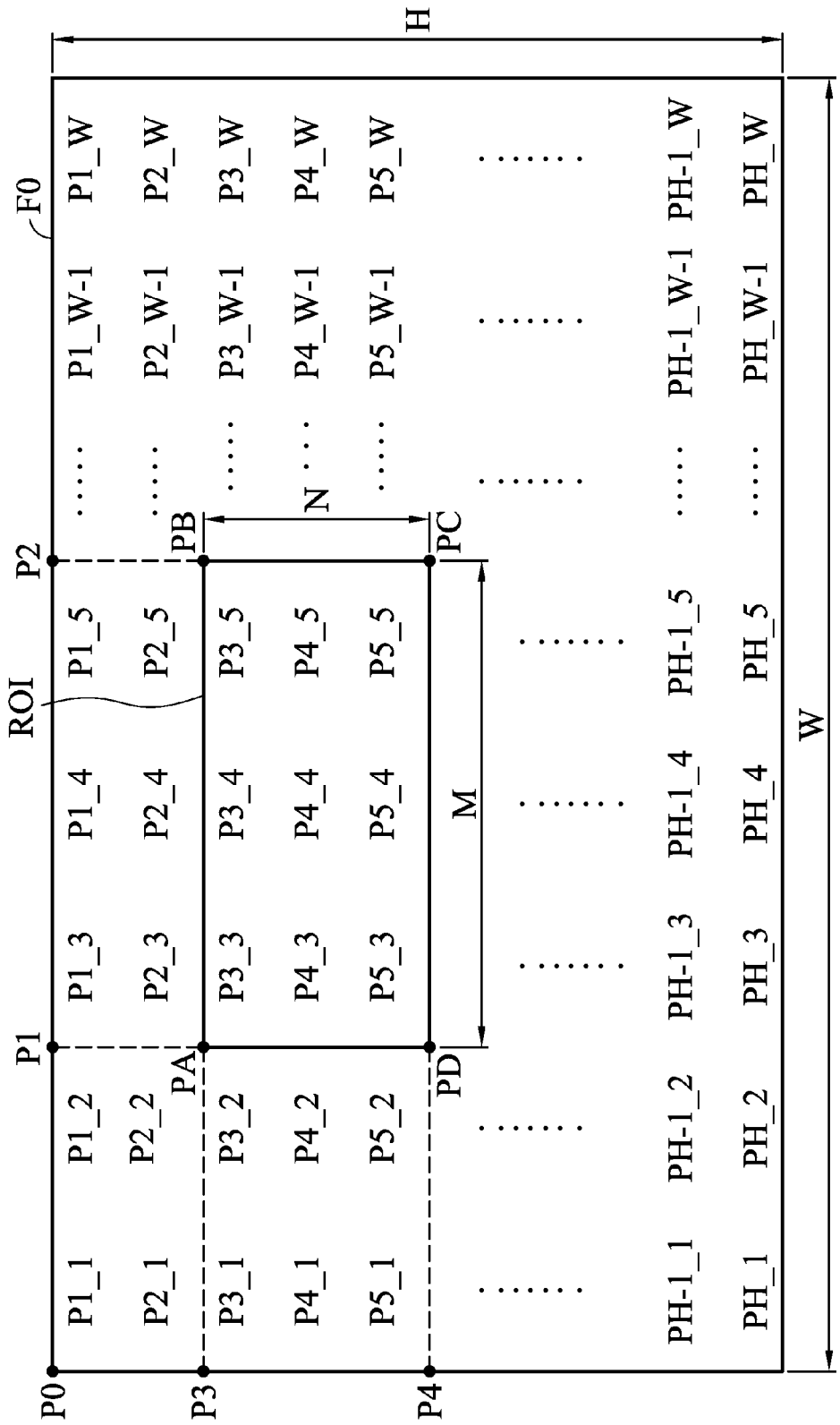
FIG. 4 is a schematic diagram illustrating an embodiment of an integration operation of an exemplary embodiment.

FIG. 4 is a schematic diagram illustrating an embodiment of an integration operation of an exemplary embodiment. In FIG. 4, the width (M) of the region of interest ROI (the second rectangle) is 3, the length (N) of the region of interest ROI (the second rectangle) is 3, the calculation command indicates the second rectangle of the region of interest ROI is on the rectangular area constituted by the point PA, the point PB, the point PC and the point PD, but it is not limited thereto. In this embodiment, when the graphics processing unit 102 receives the calculation command, the graphics processing unit 102 determines a position corresponding to the second rectangle of the region of interest ROI is on the rectangular area constituted by the point PA, the point PB, the point PC and the point PD in the image F0 according to the calculation command. As shown in FIG. 4, the image F0 can be divided into six rectangles by the point PA, the point PB, the point PC and the point PD of the region of interest ROI. The first rectangle is image F0. The second rectangle which is equal to the region of interest ROI is constituted by the point PA, the point PB, the point PC, and the point PD. The third rectangle is constituted by the point P0, the point P1, the point PA, and the point P3. The fourth rectangle is constituted by the point P0, the point P2, the point PB, and the point P3. The fifth rectangle is constituted by the point P0, the point P2, the point PC, and the point P4. The sixth rectangle is constituted by the point P0, the point P1, the point PD, and the point P4.

It should be noted that the image-value sum (the gray-level sum) of all pixels in the region of interest ROI is equal to C−B−D+A, wherein C is the image-value sum (the gray-level sum) of all pixels in the fifth rectangle, B is the image-value sum (the gray-level sum) of all pixels in the fourth rectangle, D is the image-value sum (the gray-level sum) of all pixels in the sixth rectangle, and A is the image-value sum (the gray-level sum) of all pixels in the third rectangle. Therefore, the graphics processing unit 102 selects the second pixel P2_2, the third pixel P2_5, the fourth pixel P5_5 and the fifth pixel P5_2 from the pixels of image F0 according to the position of the region of interest ROI. The graphics processing unit 102 takes the integral value of the second pixel P2_2 of the integral image IF0 as A, takes the integral value of the third pixel P2_5 of the integral image IF0 as B, takes the integral value of the fourth pixel P5_5 of the integral image IF0 as C, and takes the integral value of the fifth pixel P5_2 of the integral image IF0 as D. Next, the graphics processing unit 102 reads the integral values of the second pixel P2_2, the third pixel P2_5, the fourth pixel P5_5 and the fifth pixel P5_2 from the integral image IF0. It should be noted that the integral value of the second pixel P2_2 is A, wherein A is the sum of the gray levels of the pixel P1_1, the pixel P1_2, the pixel P2_1, and the pixel P2_2 which are included in the third rectangle constituted by the point P0, the point P1, the point PA, and the point P3. The integral value of the third pixel P2_5 is B, wherein B is the sum of the gray levels of the pixel P1_1, the pixel P1_2, the pixel P1_3, the pixel P1_4, the pixel P1_5, the pixel P2_1, the pixel P2_2, the pixel P2_3, the pixel P2_4, and the pixel P2_5 which are included in the fourth rectangle constituted by the point P0, P2, PB, P3. The integral value of the fourth pixel P5_5 is C, C is the sum of the gray levels of the pixel P1_1, the pixel P1_2, the pixel P1_3, the pixel P1_4, the pixel P1_5, the pixel P2_1, the pixel P2_2, the pixel P2_3, the pixel P2_4, the pixel P2_5, the pixel P3_1, the pixel P3_2, the pixel P3_3, the pixel P3_4, the pixel P4_5, the pixel P4_1, the pixel P4_2, the pixel P4_3, the pixel P4_4, the pixel P4_5, the pixel P5_1, the pixel P5_2, the pixel P5_3, the pixel P5_4, and the pixel P5_5 which are included in the fifth rectangle constituted by the point P0, the point P2, the point PC and the point P4. The integral value of the fifth pixel P5_2 is D, D is the sum of the gray levels of the pixel P1_1, the pixel P1_2, the pixel P2_1, the pixel P2_2, the pixel P3_1, the pixel P3_2, the pixel P4_1, the pixel P4_2, the pixel P5_1 and the pixel P5_2 which are included in the sixth rectangle constituted by the point P0, the point P1, the point PD and the point P4. It should be noted that, in FIG. 4, the first pixel P1_1 and the fourth pixel P5_5 are at opposite corners of the fifth rectangle. The fourth pixel P5_5 is at a corner of the second rectangle. The fifth rectangle incorporates the second rectangle, the third rectangle, the fourth rectangle and the sixth rectangle. The second rectangle does not overlap with the third rectangle, the fourth rectangle and the sixth rectangle. The overlap between the fourth rectangle and the sixth rectangle is the third rectangle.

Next, the graphics processing unit 102 calculates C−B−D+A by the integral value A, the integral value B, the integral value C and the integral value D read from the integral image IF0. When C−B−D+A≤0, the graphics processing unit 102 determines that the gray-level sum of the region of interest ROI is equal to C−B−D+A+$2^{k'}$, wherein k' is the predetermined number of bits. When C−B−D+A>0, the graphics processing unit 102 determines that the gray-level sum of the region of interest ROI is equal to C−B−D+A.

More specifically, the predetermined number of bits is k', and k' is equal to $\log_2(M \times N \times 2^k)$, wherein M is the width of the region of interest ROI, N is the length of the region of interest ROI, K is the predetermined bit depth of the image value. Namely, each of the integral values of the pixels P1_1~PW_H of the image F0 requires $\log_2(M \times N \times 2^k)$ of bits to store. As described above and in FIG. 4, we can know that:

$$A' = N_A \times 2^{K'} + A \quad \text{Formula (1)}$$

$$b' = N_b \times 2^{K'} + b \quad \text{Formula (2)}$$

$$C' = N_C \times 2^{K'} + C \quad \text{Formula (3)}$$

$$d' = N_d \times 2^{K'} + d \quad \text{Formula (4)}$$

wherein, "A'" is the sum of the gray levels of all pixels included in the third rectangle constituted by the point P0, the point P1, the point PA and the point P3 when the memory space is enough and there is no arithmetic overflow during the integration operation. "$N_A$" is the number of times arithmetic overflow has occurred while during performing the integration operations on the pixels of the third rectangle. "A" is the sum of the gray levels of all pixels included in the third rectangle when the memory space is reduced and arithmetic overflow(s) may have occurred during the integration operation. "b'" is the sum of the gray levels of all pixels included in the seventh rectangle constituted by the point P1, the point P2, the point PB and the point PA when the memory space is enough and there is no arithmetic overflow during the integration operation. "$N_b$" is the number of times arithmetic overflow has occurred while during performing the integration operations on the pixels of the seventh rectangle. "b" is the is the sum of the gray levels of all pixels included in the seventh rectangle when the memory space is reduced and arithmetic overflow(s) may have occurred during the integration operation. "C'" is the sum of the gray levels of all pixels included in the fifth rectangle constituted by the point P0, the point P2, the point PC and the point P4 when the memory space is enough and there is no arithmetic overflow during the integration operation. "$N_c$" is the number of times arithmetic overflow has occurred while during performing the integration operations on the pixels of the fifth rectangle. "C" is the sum of the gray levels of all pixels included in the fifth rectangle when the memory space is reduced and arithmetic overflow(s) may have occurred during the integration operation. "d'" is the sum of the gray levels of all pixels included in the eighth rectangle constituted by the point P3, the point PA, the point PD and the point P4 when the memory space is enough and there is no arithmetic overflow during the integration operation. "$N_d$" is the number of times arithmetic overflow has occurred while during performing the integration operations on the pixels of the eighth rectangle. "d" is the sum of the gray levels of all pixels included in the eighth rectangle when the memory space is reduced and there might be arithmetic overflow(s) happened during the integration operation.

According to the formula (1) formula (4), we can deduce that:

$$B' = B + N_B \times 2^{K'} = N_A \times 2^{k'} + A + N_b \times 2^{k'} + b \quad \text{formula (5)}$$

$$B + (N_B - N_A - N_b) \times 2^{k'} = A + b \quad \text{formula (6)}$$

Wherein, "B'" is the sum of the gray levels of all pixels included in the fourth rectangle constituted by the point P0, the point P2, the point PB and the point P3 when the memory space is enough and there is no arithmetic overflow during the integration operation. "$N_B$" is the number of times arithmetic overflow has occurred while during performing the integration operations on the pixels of the fourth rectangle. "B" is the sum of the gray levels of all pixels included in the fourth rectangle when the memory space is reduced and arithmetic overflow(s) may have occurred during the integration operation. After manipulating formula (5), formula (6) is obtained. It should be noted that "A" and "b" may be the overflow values due to the memory space reducing. Therefore, "A" cannot be larger than 2k', and "b" also cannot be larger than 2k'. Because "A" cannot be larger than 2k' and "b" also cannot be larger than 2k', we can know that A+b<$2 \times 2^{k'}$. Based on A+b<$2 \times 2^{k'}$, "($N_B - N_A - N_b$)" in the formula (6) can only be equal to 1 or 0. As the described above, we can deduce that:

$$\begin{cases} B = A + b, & \text{if } N_B - N_A - N_b = 0 \\ B + 2^{k'} = A + b, & \text{if } N_B - N_A - N_b = 1 \end{cases} \quad \text{formula (7)}$$

Moreover, based on formula (1) formula (4), we can deduce that:

$$D' = D + N_D \times 2^{K'} = N_A \times 2^{k'} + A + N_d \times 2^{k'} d \quad \text{formula (8)}$$

$$D + (N_D - N_A - N_d) \times 2^{k'} = A + d \quad \text{formula (9)}$$

wherein, "D'" is the sum of the gray levels of all pixels included in the sixth rectangle constituted by the point P0, the point P1, the point PD and the point P4 when the memory space is enough and there is no arithmetic overflow during the integration operation. "$N_D$" is the number of times arithmetic overflow has occurred while during performing the integration operations on the pixels of the sixth rectangle. "D" is the sum of the gray levels of all pixels included in the sixth rectangle when the memory space is reduced and arithmetic overflow(s) may have occurred during the integration operation. After manipulating formula (8), formula (9) is obtained. It should be noted that "A" and "d" may be the overflow values due to the memory space reducing. Therefore, "A" cannot be larger than 2k', and "d" also cannot be larger than 2k'. Because "A" cannot be larger than 2k' and "d" also cannot be larger than 2k', we can know that A+b<2×$2^{k'}$. Based on A+b<2×$2^{k'}$, "($N_D$–$N_A$–$N_d$)" in the formula (9) can only be equal to 1 or 0. As the described above, we can deduce that:

$$\begin{cases} D = A + d, & \text{if } N_D - N_A - N_d = 0 \\ D + 2^{k'} = A + d, & \text{if } N_D - N_A - N_d = 1 \end{cases} \quad \text{formula (10)}$$

Moreover, based on formula (1)~formula (4), we can deduce that:

$$C' = C + N_C \times 2^{k'} = \quad \text{formula (11)}$$
$$N_A \times 2^{k'} + A + N_b \times 2^{k'} + b + N_d \times 2^{k'} + d + c'$$

$$= (N_C - N_A - N_b) \times 2^{k'} = A + b + c' + d - C \quad \text{formula (12)}$$

$$c' = (N_C - N_A - N_b - N_b) \times 2^{k'} - A - b + C - d \quad \text{formula (13)}$$

$$= (N_C - N_A - N_b - N_b) \times 2^{k'} - A - (B - A) + C - (D - A) \quad \text{formula (14)}$$

wherein, "c" is the sum of the gray levels of all pixels included in the second rectangle constituted by the point PA, the point PB, the point PC and the point PD when the memory space is enough and there is no arithmetic overflow during the integration operation. "$N_C$" is the number of times arithmetic overflow has occurred while during performing the integration operations on the pixels of the second rectangle. "C" is the sum of the gray levels of all pixels included in the second rectangle when the memory space is reduced and arithmetic overflow(s) may have occurred during the integration operation. After manipulating formula (11), formula (14) is obtained. It should be noted that, if Q is equal to ($N_C$–$N_A$–$N_b$–$N_b$), formula (14) is equal to c'=Q×$2^{k'}$+C–B–D+A.

Moreover, based on formula (7) and formula (10), we can know that when ($N_B$–$N_a$–$N_b$)=0 and ($N_D$–$N_a$–$N_d$)=0:

$$Q=(N_C-N_a-N_b-N_d)-1 \quad \text{formula (15)}$$

Moreover, based on formula (7) and formula (10), we can know that when ($N_B$–$N_a$–$N_b$)=1 and ($N_D$–$N_a$–$N_d$)=0 or when ($N_B$–$N_a$–$N_b$)=0 and ($N_D$–$N_a$–$N_d$)=1:

$$Q=(N_C-N_a-N_b-N_d)-1 \quad \text{formula (16)}$$

Furthermore, based on formula (7) and formula (10), we can know that when ($N_B$–$N_a$–$N_b$)=1 and ($N_D$–$N_a$–$N_d$)=1:

$$Q=(N_C-N_a-N_b-N_d)-2 \quad \text{formula (17)}$$

Moreover, k' is $\log_2(M\times N\times 2^k)$, such that 0<c'<$2^{k'}$. As described above and formula (14), we can know that:

$$0<Q\times 2^{k'}+C-B-D+A<2^{k'} \quad \text{formula (18)}$$

Based on formula (18), Q can only equal to 1 or 0. As described above, we can know that:

$$\begin{cases} Q = 0, & \text{if } C - B - D + A > 0 \\ Q = 1, & \text{if } C - B - D + A \le 0 \end{cases} \quad \text{formula (19)}$$

Based on formula (14) and formula (19), we can know that when C–B–D+A≤0, Q=1. Therefore, the gray-level sum (c') of the region of interest ROI is equal to C–B–D+A+$2^{k'}$, wherein k' is the predetermined number of bits. When C–B–D+A>0, Q=0. Therefore, the graphics processing unit 102 determines that the gray-level sum of the region of interest ROI is equal to C–B–D+A.

Figure 5:
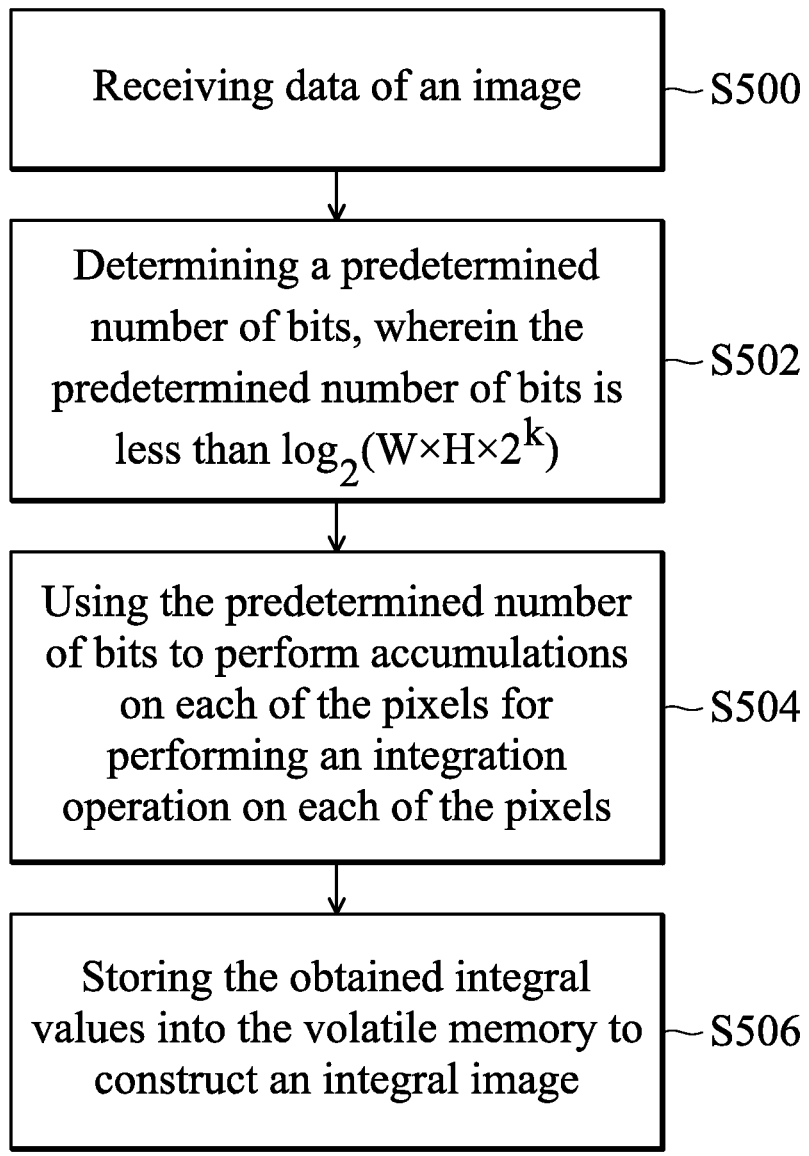
FIG. 5 is a flowchart of an image processing method according to exemplary embodiments.

FIG. 5 is a flowchart of an image processing method according to exemplary embodiments. The image processing method is applied to the graphics processing device 100 of FIG. 1. The image processing method of FIG. 5 is arranged to produce an integral image IF0 according to the received data of the image F0. The process starts at step S500.

In step S500, the graphics processing unit 102 receives data of an image F0. As shown in FIG. 2, the image F0 is a first rectangle, the first rectangle comprises a plurality of pixels P1_1~PH_W, and each of the pixels P1_1~PH_W has a predetermined bit depth for indicating the information of the pixel, wherein the W is the width of first rectangle, H is the length of the first rectangle, and k is the predetermined bit depth. Namely, the first rectangle is constituted by the pixels P1_1~PH_W, wherein on the width side of the first rectangle has a number W of pixels, on the length side of first rectangle has a number H of pixels, and the image values which are arranged to represent the pixels P1_1~PH_W has a k number of bits. It should be noted that, in one embodiment the image value can be the gray level, but it is not limited thereto. In other embodiment, the image values can also be the intensities or other information.

Next, in step S502, the graphics processing unit 102 determines a predetermined number of bits, wherein the predetermined number of bits is less than $\log_2(W\times H\times 2^k)$ number of bits. In one embodiment, the graphics processing unit 102 determines the predetermined number of bits according to the size of the region of interest ROI. More specifically, the graphics processing device 100 is arranged to recognize at least one specific object in the image F0, such as human faces, license plates, barcodes, etc., but it is not limited thereto. Therefore, the region of interest ROI of the graphics processing device 100 has a predetermined fixed size. For example, when the specific object is the human face, the region of interest ROI is a rectangle having a size that can contain a human face. When the specific object is the license plate, the region of interest ROI is a rectangle having a size that can contain a license plate, but it is not limited thereto. In the present invention, the region of interest ROI is a second rectangle having a fixed size, wherein M is the width of the second rectangle, N is the length of the second rectangle. Namely, on the width side of the region of interest ROI (the second rectangle) has a number M of pixels, and on the length side of the region of interest ROI (the second rectangle) has a number N of pixels. In one embodiment, the graphics processing unit 102 determines the predetermined number of bits is $\log_2(M\times N\times 2^k)$ according to the size of the region of interest ROI. Namely, each of the pixels P1_1~PH_W of the image F0 having W×H pixels needs $\log_2(M\times N\times 2^k)$ of bits to store, and the integral image IF0 requires W×H×$\log_2(M\times N\times 2^k)$ of bits to store. It should be noted that the size of the region of interest ROI is predetermined. Therefore, in some embodiments, the predetermined number of bits is a value pre-stored in the graphics processing device 100. Namely, the value of the predetermined number of bits determined in step S504 is pre-stored in the non-violate memory 106. The graphics processing unit 102 can retrieve a predetermined address of the memory to obtain the predetermined number of bits.

Next, in step S504, the graphics processing unit 102 uses the predetermined number of bits to perform accumulations on each of the pixels P1_1~PH_W to accumulate the image values (the gray levels) of the pixels P1_1~PH_W to obtain the integral values of the pixels P1_1~PH_W, wherein the graphics processing unit 102 performs the accumulations for performing an integration operation on each of the pixels P1_1~PH_W of the image F0, and the predetermined number of bits is less than $\log_2(W \times H \times 2^k)$ number of bits. More specifically, as shown in FIG. 3, the graphics processing unit 102 is arranged to select a first pixel from the pixels P1_1~P3_6, perform accumulations of the gray levels (the image values) of the pixels P1_1~P3_6 from the first pixel of the pixels P1_1~P3_6 to perform an integration operation on each of the pixels P1_1~P3_6 of the image F0. It should be noted that, the first pixel is at a corner of the first rectangle. In this embodiment, the pixels at the corner of the first rectangle are the pixel P1_1, the pixel P1_6, the pixel P3_1 and the pixel P3_6. The graphics processing unit 102 selects one pixel from the pixel P1_1, the pixel P1_6, the pixel P3_1 and the pixel P3_6 to be the first pixel. In this embodiment, the graphics processing unit 102 selects the pixels P1_1 to be the first pixel, but it is not limited thereto. In other embodiments, the graphics processing unit 102 can select the pixel P1_6, the pixel P3_1 or the pixel P3_6 to be the first pixel. More specifically, the graphics processing unit 102 adds the gray level of a current processed pixel and the gray levels of the pixels on the left side and the upper side of the current processed pixel to obtain the integral value of the current processed pixel, wherein at least one of the integral values of the pixels is the overflow value. More specifically, the memory space required to store the integral image IF0 is less than $W \times H \times \log_2(W \times H \times 2^k)$ of bits, such that the memory space required to store each of the integral values is less than $\log_2(W \times H \times 2^k)$ of bits. However, when the memory space of each of the integral value is less than $\log_2(W \times H \times 2^k)$, the result of the integration operation may include overflow values. For example, the predetermined number of bits is k', a specific pixel has a $N_X$ number of times of arithmetic overflow in the integration operation, and the integral value of the specific pixel in the integral image IF0 is X. Therefore, the integral value of the specific pixel in the integral image IF0 is an overflow value, and the correct integral value of the specific pixel is $X + N_X \times 2^{k'}$.

Next, in step S506, the graphics processing unit 102 stores the obtained integral values into the volatile memory 104 to construct an integral image IF0 of the image F0. The process ends at step S506.

Figure 6:
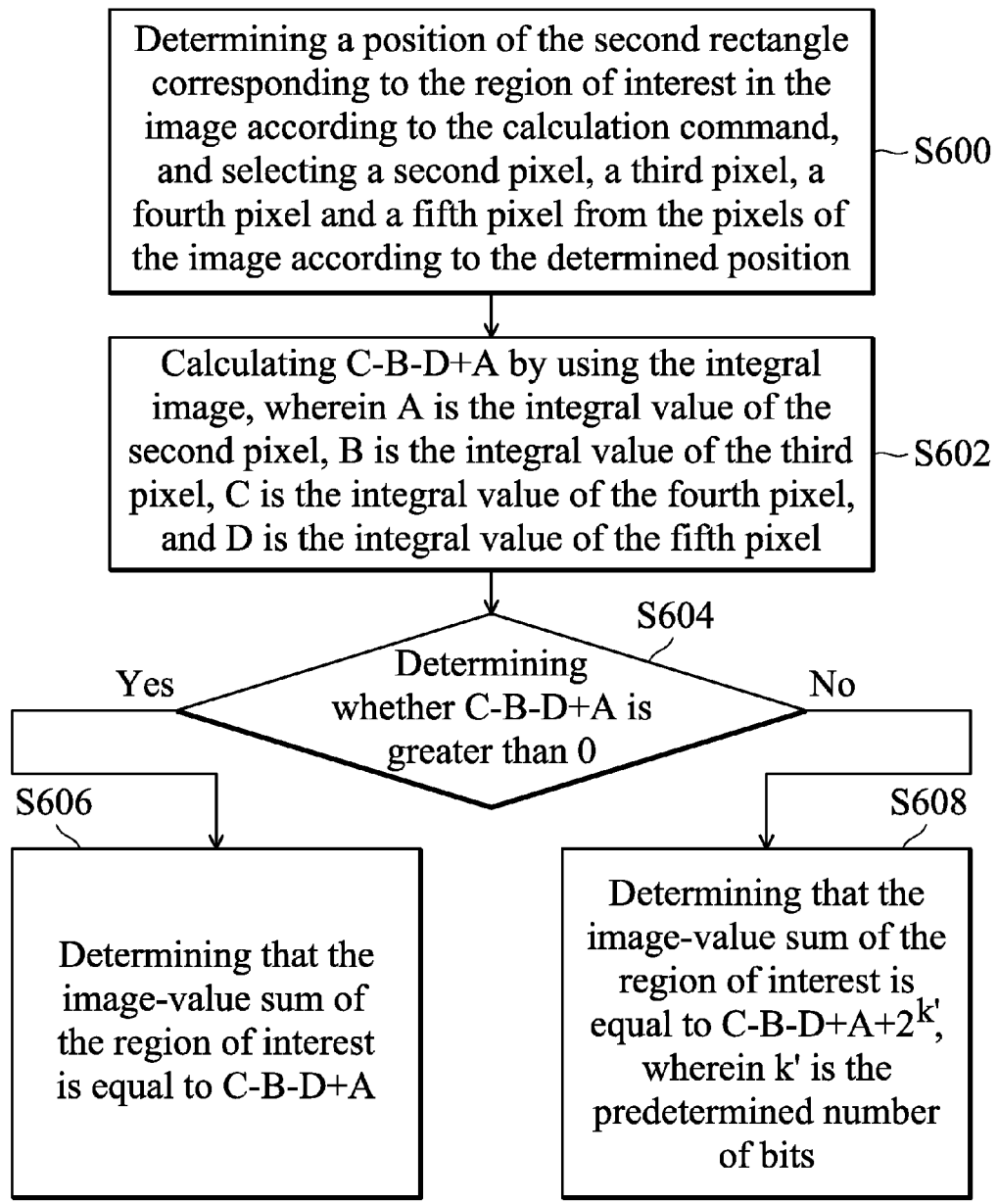
FIG. 6 is a flowchart of another image processing method according to exemplary embodiments.

FIG. 6 is a flowchart of another image processing method according to exemplary embodiments. The image processing method of FIG. 6 is applied to the graphics processing device 100 of FIG. 1. The image processing method of FIG. 6 is arranged to calculate the sum of the image values of the region of interest ROI by using the integral image IF0 produced by the image processing method of FIG. 5. The process starts at step S600.

In step S600, the graphics processing unit 102 determines a position of the second rectangle corresponding to the region of interest ROI in the image F0 according to the calculation command, and selects a second pixel, a third pixel, a fourth pixel and a fifth pixel from the pixels of the image F0 according to the determined position. It should be noted that the calculation command can be produced by the graphics processing unit 102 or received from other devices. Moreover, the integral value of the second pixel corresponds to a third rectangle, the integral value of the third pixel corresponds to a fourth rectangle, the integral value of the fourth pixel corresponds to a fifth rectangle and the integral value of the fifth pixel corresponds to a sixth rectangle. The first pixel and the fourth pixel are at opposite corners of the fifth rectangle. The fourth pixel is at a corner of the second rectangle. The fifth rectangle incorporates the second rectangle, the third rectangle, the fourth rectangle and the sixth rectangle. The second rectangle does not overlap with the third rectangle, the fourth rectangle and the sixth rectangle. The overlap between the fourth rectangle and the sixth rectangle is the third rectangle. The image F0 can be divided into six rectangles by the point PA, the point PB, the point PC and the point PD of the region of interest ROI. The first rectangle is image F0. The second rectangle which is equal to the region of interest ROI is constituted by the point PA, the point PB, the point PC, and the point PD. The third rectangle is constituted by the point P0, the point P1, the point PA, and the point P3. The fourth rectangle is constituted by the point P0, the point P2, the point PB, and the point P3. The fifth rectangle is constituted by the point P0, the point P2, the point PC, and the point P4. The sixth rectangle is constituted by the point P0, the point P1, the point PD, and the point P4. Therefore, the graphics processing unit 102 can determine the second pixel, the third pixel, the fourth pixel and the fifth pixel respectively correspond to the third rectangle, the fourth rectangle, the fifth rectangle and the sixth rectangle according to the point PA, the point PB, the point PC, and the point PD of the second rectangle (the region of interest ROI). More specifically, in FIG. 4, the graphics processing unit 102 takes the integral value of the second pixel P2_2 of the integral image IF0 as A, takes the integral value of the third pixel P2_5 of the integral image IF0 as B, takes the integral value of the fourth pixel P5_5 of the integral image IF0 as C, and takes the integral value of the fifth pixel P5_2 of the integral image IF0 as D. Next, the graphics processing unit 102 reads the integral values of the second pixel P2_2, the third pixel P2_5, the fourth pixel P5_5 and the fifth pixel P5_2 from the integral image IF0.

Next, in step S602, the graphics processing unit 102 calculates C−B−D+A by using the integral image IF0, wherein A is the integral value of the second pixel, B is the integral value of the third pixel, C is the integral value of the fourth pixel, and D is the integral value of the fifth pixel. It should be noted that, in one embodiment, the gray-level sum of all pixels in the region of interest ROI is equal to C−B−D+A, wherein C is the gray-level sum of all pixels in the fifth rectangle, B is the gray-level sum of all pixels in the fourth rectangle, D is the gray-level sum of all pixels in the sixth rectangle, and A is the gray-level sum of all pixels in the third rectangle.

Next, in step S604, the graphics processing unit 102 determines whether C−B−D+A is greater than 0. When C−B−D+A is greater than 0, the process goes to step S606, otherwise, the process goes to step S608.

In step S606, the graphics processing unit 102 determines that the image-value sum (the gray-level sum) of the region of interest ROI is equal to C−B−D+A.

In step S608, the graphics processing unit 102 determines that the image-value sum (the gray-level sum) of the region of interest ROI is equal to $C-B-D+A+2^{k'}$, wherein k' is the predetermined number of bits. Namely, k' is equal to $\log_2(M \times N \times 2^k)$.

The image processing method of the present invention can produce a smaller integral image IF0, and calculate the sum of the image values in the region of interest ROI by using the smaller integral image IF0.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method, applied to a graphics processing unit, comprising:
   receiving, by said graphics processing unit, data of an image, wherein the image is a first rectangle, the first rectangle is constituted by a plurality of pixels, and the pixels of the image are represented by a plurality of image values with a predetermined bit depth in the data;
   using a predetermined number of bits to perform an accumulation of the image values of the pixels for performing an integration operation on each of the pixels of the image, wherein the predetermined number of bits is less than $\log_2(W \times H \times 2^k)$ number of bits, W is width of the first rectangle, H is length of the first rectangle, and k is the predetermined bit depth, wherein W and H are positive integers;
   obtaining a plurality of integral values of the pixels by the integration operation, wherein at least one of the integral values is overflow value; and
   storing the integral values into a volatile memory to construct an integral image of the image.

2. The image processing method as claimed in claim 1, further comprising determining the predetermined number of bits according to a size of a region of interest.

3. The image processing method as claimed in claim 2, wherein the predetermined number of bits is $\log_2(M \times N \times 2^k)$ number of bits, the region of interest is a second rectangle, M is width of the second rectangle, N is length of the second rectangle, and k is the predetermined bit depth, wherein M and N are positive integers.

4. The image processing method as claimed in claim 3, wherein the integral image requires $W \times H \times \log_2(M \times N \times 2^k)$ of bits to store.

5. The image processing method as claimed in claim 3, wherein the integration operation is arranged to perform the accumulation on each of the pixels to accumulate a plurality of gray levels of the pixels from a first pixel of the pixels to obtain the integral values, wherein the first pixel is at a corner of the first rectangle.

6. The image processing method as claimed in claim 5, further comprising:
   determining a position of the second rectangle corresponding to the region of interest in the image according to a calculation command, and selecting a second pixel, a third pixel, a fourth pixel and a fifth pixel from the pixels according to the position;
   calculating C−B−D+A by the integral image, wherein A is the integral value of the second pixel, B is the integral value of the third pixel, C is the integral value of the fourth pixel, and D is the integral value of the fifth pixel;
   when $C-B-D+A \leq 0$, determining a gray-level sum of the region of interest is equal to $C-B-D+A+2^{k'}$, wherein k' is the predetermined number of bits; and
   when $C-B-D+A > 0$, determining the gray-level sum of the region of interest is equal to C−B−D+A, wherein A, B, C and D are positive integers.

7. The image processing method as claimed in claim 6, wherein the integral value of the second pixel corresponds to a third rectangle, the integral value of the third pixel corresponds to a fourth rectangle, the integral value of the fourth pixel corresponds to a fifth rectangle and the integral value of the fifth pixel corresponds to a sixth rectangle.

8. The image processing method as claimed in claim 7, wherein the first pixel and the fourth pixel are at opposite corners of the fifth rectangle, the fourth pixel is at a corner of the second rectangle, the fifth rectangle incorporates the second rectangle, the third rectangle, the fourth rectangle and the sixth rectangle, the second rectangle do not overlap with the third rectangle, the fourth rectangle and the sixth rectangle, and the overlap between the fourth rectangle and the sixth rectangle is the third rectangle.

9. An image processing method, applied to a graphics processing unit, comprising:
   determining, by said graphics processing unit, a position of a region of interest in an image in response to a calculation command, and selecting a first pixel, a second pixel, a third pixel, a fourth pixel and a fifth pixel from a plurality pixels of the image according to the position, wherein the image is a first rectangle, the first rectangle is constituted by the pixels, each of the pixels has a predetermined bit depth, the first pixel is at a corner of the first rectangle, the region of interest is a second rectangle;
   calculating C−B−D+A by an integral image of the image, wherein the integral image is stored in a volatile memory;
   wherein the integral image comprises a plurality of integral values of the pixels, A is the integral value of the second pixel, B is the integral value of the third pixel, C is the integral value of the fourth pixel, and D is the integral value of the fifth pixel;
   when $C-B-D+A \leq 0$, determining a gray-level sum of the region of interest is equal to $C-B-D+A+2^{k'}$, wherein k' is a predetermined number of bits; and when C−B−D+A>0, determining the gray-level sum of the region of interest is equal to C−B−D+A, wherein A, B, C and D are positive integers.

10. The image processing method as claimed in claim 9, wherein the integral value of the second pixel corresponds to a third rectangle, the integral value of the third pixel corresponds to a fourth rectangle, the integral value of the fourth pixel corresponds to a fifth rectangle and the integral value of the fifth pixel corresponds to a sixth rectangle.

11. The image processing method as claimed in claim 10, wherein the first pixel and the fourth pixel are at opposite corners of the fifth rectangle, the fourth pixel is at a corner of the second rectangle, the fifth rectangle incorporates the second rectangle, the third rectangle, the fourth rectangle and the sixth rectangle, the second rectangle does not overlap with the third rectangle, the fourth rectangle and the sixth rectangle, and the overlap between the fourth rectangle and the sixth rectangle is the third rectangle.

12. The image processing method as claimed in claim 9, wherein the step of obtaining the integral image further comprises:
using the predetermined number of bits to perform an accumulation of a plurality of image values of the pixels for performing an integration operation on each of the pixels of the image, wherein the predetermined number of bits is less than $\log_2(W \times H \times 2^k)$ number of bits, W is width of the first rectangle, H is length of the first rectangle, and k is the predetermined bit depth;
obtaining the integral values of the pixels by the integration operation, wherein at least one of the integral values is overflow value; and
storing the integral values into a volatile memory to construct the integral image of the image, wherein W and H are positive integers.

13. The image processing method as claimed in claim 12, wherein the step of obtaining the integral images further comprises determining the predetermined number of bits according to a size of a region of interest.

14. The image processing method as claimed in claim 13, wherein the predetermined number of bits is $\log_2(M \times N \times 2^k)$ number of bits, M is width of the second rectangle, N is length of the second rectangle, and k is the predetermined bit depth, wherein M and N are positive integers.

15. The image processing method as claimed in claim 14, wherein the integral image requires $W \times H \times \log_2(M \times N \times 2^k)$ of bits to store.

16. The image processing method as claimed in claim 14, wherein the integration operation is arranged to perform the accumulation on each of the pixels to accumulate a plurality of gray levels of the pixels from a first pixel of the pixels to obtain the integral values.

\* \* \* \* \*